April 1, 1969   R. LANGPAPE ET AL   3,436,566
THERMIONIC ENERGY CONVERTER
Filed Dec. 28, 1965

United States Patent Office 3,436,566
Patented Apr. 1, 1969

3,436,566
THERMIONIC ENERGY CONVERTER
Reinhart Langpape, Mannheim, and Alfred Jester, Speyer am Rhein, Germany, assignors to Brown Boveri & Cie Aktiengesellschaft, Mannheim-Kafertal, Germany, a corporation of Germany
Filed Dec. 28, 1965, Ser. No. 516,999
Claims priority, application Germany, Feb. 25, 1965, B 80,710
Int. Cl. H02k 7/00
U.S. Cl. 310—4                                   8 Claims

ABSTRACT OF THE DISCLOSURE

A thermionic energy converter comprising an emitter electrode and a collector electrode with an interelectrode space therebetween. Means are provided to introduce caesium vapor in the interelectrode space at the operating temperature of the converter. In addition, individual storage containers, communicating with the interelectrode space, are provided for introducing into the space the vapor of at least one material selected from the group consisting of the alkaline earth metals calcium, strontium and barium and volatile compounds thereof. The volatile compound may be a halide of calcium, strontium or barium, plus at least one halogen element. Membranes are provided in the communicating paths between the interelectrode space and respective individual storage containers to selectively seal off vapors of respective materials in certain of the containers while passing through vapors of other selected materials in respective ones of the containers.

---

Our invention relates to thermionic energy converters. More particularly it relates to thermionic converters which are of improved efficiency.

It is, at present, known to employ thermionic energy converters for the direct conversion of heat energy to electrical energy. Such thermionic converters comprise two electrodes, one of which, i.e., the emitter electrode is heated to cause it to emit electrons from its surface, such thermionically emitted electrons being collected at the other of the electrodes, i.e., the collector electrode, which is spaced a short distance from the emitter electrode. An electrically powered utilization device is connected in circuit with the collector electrode.

The efficiency of such type thermionic energy converter depends, among other factors, upon the difference between the work functions respectively of the emitter and the collector electrodes. Ideally, the work function of the emitter electrode should have a particular optimum value while the work function of the collector electrode should be of the smallest posesible value.

In addition, the temperature permitted of the emitter electrode should be relatively high to enable satisfactory output, i.e., efficiency. At temperatures which are generally employed for producing efficient thermionic energy conversion, only metals having a high melting point may be used, examples of such metals being niobium, molybdenum, tantalum, tungsten, rhenium, and the like. However, the respective work functions of these metals are essentially of a higher value than one enabling the attainment of satisfactory efficiency.

In order to effect a decrease in the thermionic emitting temperature at the surface of an emitter electrode which comprises a high melting point metal, caesium has been provided in the space between the emitter and collector electrodes, the caesium assuming the gaseous state at the elevated temperatures as set forth hereinabove, the space charge at the same time, being compensated. However, in this arrangement, there is presented the disadvantage that caesium has a relatively large collision, i.e., absorption cross section for electrons, i.e., there are frequent collisions of the thermionically emitted electrons and the caesium atoms in their path from the emitter electrode to the collector electrode. This phenomenon results in a relatively high internal electrical resistance in the thermionic energy converter.

To reduce such high internal resistance, it is known to employ caesium fluoride in addition to caesium in the space between the electrodes. The presence of the caesium fluoride lowers the pressure of the caesium vapor which is necessary to reduce the work function of the emitter electrode. Consequently, the number of collisions between the thermionically emitted electrons and the caesium atoms is decreased, thereby decreasing the internal electrical resistance of the converter. However, the presence of the caesium fluoride causes the temperature at the collector electrode, whereat the latter electrode has its lowest work function, to be so reduced that an essential advantage presented in the use of the thermionic energy converter, i.e., its high waste heat temperature is decreased.

It is also known to add barium as an additive to the caesium. The work function of the emitter is then regulated by the barium. The effect of the inclusion of the barium is to decrease the vapor pressure of the caesium and to decrease the internal resistance. The use of the barium also offers the advantage in that it has a subtsantially lower collision cross section for electrons than caesium.

When barium is employed, as immediately described hereinabove, a storage container therefor has to be maintained at a temperature of approximately 1200° K. so that the vapor pressure of the barium is adequately high. To prevent the precipitating of the barium on the collector electrode, the latter electrode would have to be maintained at a temperature higher than that of the storage container. However, such collector electrode temperature may not be so high that the net current density in the thermionic energy converter is reduced by electron emission from the collector electrode. However, if the temperature of the barium storage container is lowered to enable the use of not too high a temperature at the collector electrode, then the vapor pressure of the barium falls to too low a value and becomes inadequate for fulfilling its intended purpose, i.e., the reducing of the work function of the collector electrode to its optimum value.

It has been found that when barium alone is provided in the inter-electrode space, i.e., no caesium, or no caesium and caesium fluoride are employed, then the same disadvantages are presented. Thus, whether caesium, caesium and caesium fluoride, caesium and barium, or barium are employed, the efficiency of the thermionic energy converter is deleteriously affected.

Accordingly, it is an important object of this invention to provide a thermionic energy converter which is of substantially improved efficiency as compared with known converters employed for the same purpose.

This object is attained by providing a thermionic energy converter comprising an emitter and a collector which are spaced a small distance from each other, the space between the electrodes being filled with caesium vapor. In addition, according to the invention, this space also contains the vapor of one or the vapors of several materials which have a small election collision cross section and which form ions, both positive and negative.

A material which forms positive ions such as calcium, strontium or barium and a material which produces negative ions such as fluorine, chlorine, bromine or iodine or a composition containing these materials may be used in the interelectrode space together with the caesium. In addition, a material for providing positive and negative ions such as, for example, a halide of barium, calcium or strontium, may also be added in the interelectrode space. The latter halides dissociate in the gaseous state on the hot surface at the emitter electrode into positive and negative ions.

Whether two materials, viz., one of which contains atoms for providing positive ions and one of which contains atoms for providing negative ions, or whether one compound is added which ionizes in the gaseous state, in each case, the presence of the negative ions at a predetermined vapor pressure of electropositive atoms, results in a greater decrease in the work functions of the emitter and collector electrodes than would occur in the absence of the negative ions. Thereby, the work function of the emitter may be reduced to an optimum value without the need for exceeding the highest permissible temperature for the collector electrode. An advantageously low work function is achieved for the collector electrode at an adequately high, but not too high, temperature at the collector electrode (about 1100 K.).

The various materials to be employed in the interelectrode space are kept in storage containers, the respective temperatures of the various containers being independently regulated. Preferably, the storage containers are connected to the inter-electrode space by means of bores having a suitably low cross section, such cross section being, for example, less than 1.5 square millimeters. In accordance with the invention, that storage container which has to be maintained at the highest of the storage container temperatures, may be located within the wall of the collector electrode. It is preferred that at least one of the storage containers be sealed off from the inter-electrode space by a membrane which is permeable only to the material contained in the sealed-off container. In this latter arrangement, the bore between the sealed-off container and the inter-electrode space may have a larger cross section.

In addition, several storage containers may be connected to the vapor region, i.e., the interelectrode space, by a common nozzle. The storage containers may respectively be disposed at various different distances from the vapor region. With such latter different dispositions, each storage container can be kept at a temperature which is appropriate for the material respectively contained therein.

Generally speaking and in accordance with the invention, there is provided a thermionic energy converter comprising an emitter electrode and a collector electrode in opposing spaced relationship to define an interelectrode space therebetween. Caesium is disposed in the space to provide caesium vapor at the operating temperature of the converter, and means are included for introducing into the space, the vapor of a material which has a relatively small electron collision cross section and which produces positive and negative ions.

The foregoing and more specific objects of our invention will be apparent from and will be mentioned in the following description of a thermionic energy converter according to the invention taken in conjunction with the accompanying drawing.

Figure 1:
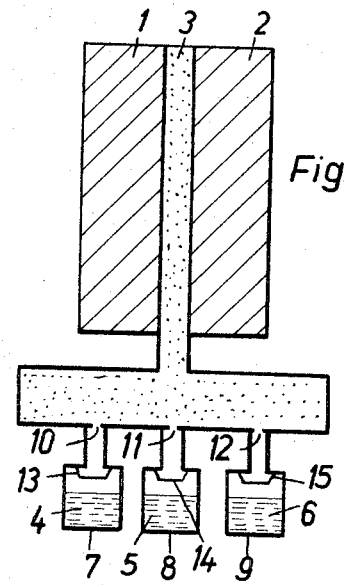
FIG. 1 is a schematic depiction partly in section of an illustrative embodiment of a thermionic energy converter constructed in accordance with the principles of the invention.

Referring now to FIG. 1, there is shown therein a thermionic energy converter comprising an emitter electrode 1 and a collector electrode 2. The space 3 between electrodes 1 and 2 is filled with the vapors of materials 4, 5 and 6 contained in the storage containers 7, 8 and 9 respectively. Storage containers 7, 8 and 9 are connected with interelectrode space 3 through small cross section bores 10, 11 and 12 in nozzles extending from containers 7, 8 and 9 respectively. Storage containers 7, 8 and 9 are respectively sealed off from inter electrode space 3 by the membranes 13, 14 and 15 respectively. Membranes 13, 14 and 15 are permeable to the respective vapors of materials 4, 5 and 6 contained in containers 7, 8 and 9, but are impermeable to all other materials in any aggregate form.

Figure 2:
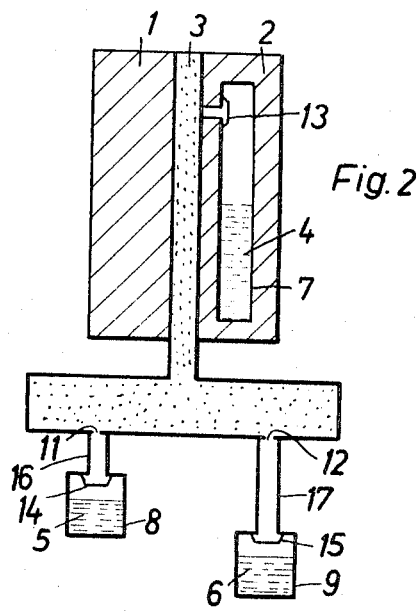
FIG. 2 is a view similar to that of FIG. 1 and is a depiction of a modification of the thermionic energy converter shown in FIG. 1.

In FIG. 2, which shows an arrangement which is a modification of that shown in FIG. 1 and in which the same numerals are used to designate structures respectively corresponding to those of the arrangement of FIG. 1, storage container 7 is located within collector electrode 2 while storage container 8 is connected to space 3 by nozzle 16 and storage container 9 is connected to space 3 by nozzle 17. With the selection of different lengths for nozzles 16 and 17 and the location of container 7 within the wall of collector electrode 2, each of storage containers 7, 8 and 9 may be independently maintained at that temperature which is respectively necessary to provide the required vapor pressure for the material contained in the storage container.

Figure 3:
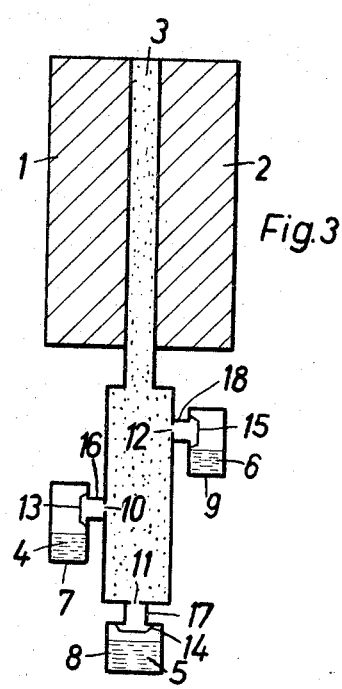
FIG. 3 is a view similar to that of FIGS. 1 and 2 and shows another modification of the converter shown in FIG. 1.

In the arrangement of FIG. 3, the storage containers 7, 8 and 9 are connected to interelectrode space 3 through a common nozzle 19. Individual storage containers 7, 8 and 9 respectively are connected to common nozzle 19, which may have a larger cross section, through smaller nozzles 16, 17 and 18 having small cross section bores 10, 11 and 12 respectively.

Figure 4:
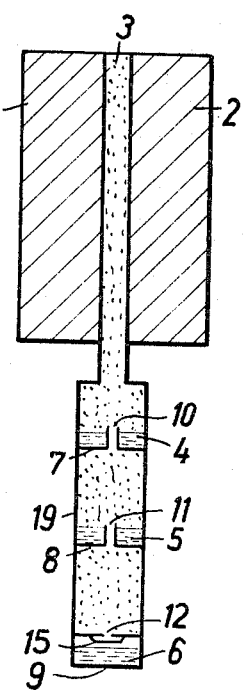
FIG. 4 is a view similar to that of FIGS. 1-3 which shows still another modification of the converter.

The arrangement shown in FIG. 4 is a modification of that shown in FIG. 3 and illustrates an embodiment according to the invention in which all of the storage containers 7, 8, and 9 are located with common nozzle 19. In the arrangenment shown in FIG. 4, it is to be noted that only bore 12 of container 9 may be replaced by a membrane 15, membrane 15 being permeable only to material 6.

It will be obvious to those skilled in the art upon studying this disclosure that thermionic energy converters according to our invention permit of a great variety of modifications and hence can be given embodiments other than those particularly illustrated herein without departing from the essential features of the invention and within the scope of the claims annexed hereto.

We claim:

1. A thermionic energy converter comprising an emitter electrode and a collector electrode in opposing spaced relationship arranged to define an interelectrode space therebetween, means for providing a vapor comprising caesium and a halogen element in said space at the operating temperature of said converter, and means for introducing additionally into said space the vapor of at least one material selected from the group consisting of the alkaline earth metals calcium, strontium, barium, and volatile compounds of said alkaline earth metals.

2. A thermionic energy converter according to claim 1, said voltaile compounds including at least one halide of calcium, strontium or barium.

3. A thermionic energy converter as defined in claim 2, said halide being a material selected from the group consisting of fluorides, chlorides, bromides, and iodides of the alkaline earth metals barium, calcium or strontium.

4. A thermionic energy converter as defined in claim 1, said means for providing a vapor including a plurality of individual storage containers (7, 8, 9), each of said containers having bores of relatively small cross section providing flow paths between said containers and said interelectrode space, and means for selectively controlling flow of respective materials (4, 5, 6) along said paths from said containers to said inter-electrode space.

5. A thermionic energy converter as defined in claim 4, at least one of said individual storage containers being disposed within said collector electrode for temperature control of material contained therein independent of others of said storage containers, said others of said containers each having bores of relatively small cross section for connecting the respective containers to said inter-electrode space, said containers having means for heating the respective materials contained therein to the temperature required for proper vaporizing of the materials contained therein.

6. A thermionic energy converter as defined in claim 4, said means for controlling flow comprising a membrane in at least one of said containers permeable to the vapor of the respective material contained in said one container, said membrane being arranged to seal off said one container from said inter-electrode space.

7. A thermionic energy converter as defined in claim 4, further including a common nozzle connected to said interelectrode space, said bores of relatively small cross section having a minimum cross section of less than 1.5 square millimeters and being arranged to connect said respective storage containers through said nozzle with said interelectrode space.

8. A thermionic energy converter as defined in claim 7, said common nozzle communicating with said interelectrode space and with said bores.

References Cited
UNITED STATES PATENTS

| | | | |
|---|---|---|---|
| 2,510,397 | 6/1950 | Hansell | 310—4 |
| 3,201,618 | 8/1965 | Coleman | 310—4 |
| 3,215,868 | 11/1965 | Pidd et al. | 310—4 |
| 3,218,487 | 11/1965 | Pidd et al. | 310—4 |
| 3,265,910 | 8/1966 | Thomas | 310—4 |
| 3,353,037 | 11/1967 | Jester et al. | 310—4 |
| 3,157,802 | 11/1964 | Fox | 310—4 |

HILTON O. HIRSHFIELD, *Primary Examiner.*

D. F. DUGGAN, *Assistant Examiner.*

U.S. Cl. X.R.

313—229